US011227591B1

(12) United States Patent
Ockene et al.

(10) Patent No.: US 11,227,591 B1
(45) Date of Patent: Jan. 18, 2022

(54) CONTROLLED ACCESS TO DATA

(71) Applicant: Amazon Technologies, Inc., Seattle, WA (US)

(72) Inventors: Lawrence Ockene, Seattle, WA (US); Gregory Chappell, Seattle, WA (US); Fausto Rafael Betances, Shoreline, WA (US); Marissa Mierow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 16/431,127

(22) Filed: Jun. 4, 2019

(51) Int. Cl.
*G10L 15/22* (2006.01)
*G10L 15/18* (2013.01)
*G10L 15/30* (2013.01)
*G10L 13/00* (2006.01)
*G10L 15/14* (2006.01)
*G10L 15/08* (2006.01)
*G10L 15/16* (2006.01)

(52) U.S. Cl.
CPC .............. *G10L 15/22* (2013.01); *G10L 13/00* (2013.01); *G10L 15/1815* (2013.01); *G10L 15/30* (2013.01); *G10L 15/142* (2013.01); *G10L 15/16* (2013.01); *G10L 2015/088* (2013.01); *G10L 2015/223* (2013.01)

(58) Field of Classification Search
USPC .......................... 704/246, 247, 251, 252, 257
See application file for complete search history.

(56) References Cited

U.S. PATENT DOCUMENTS

| | | |
|---|---|---|
| 5,778,395 A | 7/1998 | Whiting et al. |
| 5,930,514 A | 7/1999 | Thompson et al. |
| 6,105,012 A | 8/2000 | Chang et al. |
| 6,324,650 B1 | 11/2001 | Ogilvie |
| 6,367,019 B1 | 4/2002 | Ansell et al. |
| 7,203,844 B1 | 4/2007 | Oxford |
| 7,559,088 B2 | 7/2009 | Cohen et al. |
| 7,657,928 B2 | 2/2010 | Shima et al. |
| 7,849,328 B2 | 12/2010 | Blumenau |
| 8,887,298 B2 | 11/2014 | Reid |
| 10,320,757 B1 | 6/2019 | Secker-Walker et al. |
| 10,529,336 B1 * | 1/2020 | Matthews ............. G06F 16/635 |
| 10,616,199 B2 * | 4/2020 | Du ......................... H04L 63/08 |
| 10,728,384 B1 * | 7/2020 | Channakeshava ...... G10L 15/05 |
| 10,747,894 B1 * | 8/2020 | Cline ...................... G06F 40/35 |
| 2002/0033838 A1 | 3/2002 | Krueger et al. |
| 2002/0129275 A1 | 9/2002 | Decuir |
| 2002/0194314 A1 | 12/2002 | Kouznetsov et al. |
| 2003/0048907 A1 | 3/2003 | Nakahara et al. |
| 2003/0223766 A1 | 12/2003 | Imai |
| 2003/0236950 A1 | 12/2003 | Clarke et al. |
| 2004/0148356 A1 | 7/2004 | Bishop, Jr. et al. |
| 2004/0193899 A1 | 9/2004 | Satake et al. |

(Continued)

*Primary Examiner* — Leonard Saint Cyr
(74) *Attorney, Agent, or Firm* — Pierce Atwood LLP

(57) ABSTRACT

Described are techniques for tracking where user sensitive data has been sent (and optionally stored). Also described are techniques for ensuring user sensitive data is deleted, from all applicable locations, in response to a user command to delete its sensitive data. In at least some embodiments, a natural language processing system may cause a skill, in communication with but not implemented by the natural language processing system, to delete sensitive data.

20 Claims, 11 Drawing Sheets

(56) References Cited

U.S. PATENT DOCUMENTS

| | | |
|---|---|---|
| 2005/0114684 A1 | 5/2005 | Ohno |
| 2006/0041932 A1 | 2/2006 | Cromer et al. |
| 2006/0078127 A1 | 4/2006 | Cacayorin |
| 2006/0129830 A1 | 6/2006 | Haller et al. |
| 2006/0210085 A1 | 9/2006 | Ho et al. |
| 2007/0061528 A1 | 3/2007 | Shibata et al. |
| 2008/0037723 A1 | 2/2008 | Milstein et al. |
| 2008/0168229 A1 | 7/2008 | Beelen et al. |
| 2011/0113109 A1 | 5/2011 | LeVasseur et al. |
| 2012/0005165 A1 | 1/2012 | Tsai et al. |
| 2013/0144845 A1 | 6/2013 | Ghuge et al. |
| 2014/0053002 A1 | 2/2014 | Muller et al. |
| 2014/0067929 A1 | 3/2014 | Kirigin et al. |
| 2015/0201040 A1 | 7/2015 | Horling et al. |
| 2017/0155631 A1* | 6/2017 | Du .................... H04L 63/08 |
| 2019/0013038 A1* | 1/2019 | Thomson ............ H04L 63/0407 |

* cited by examiner

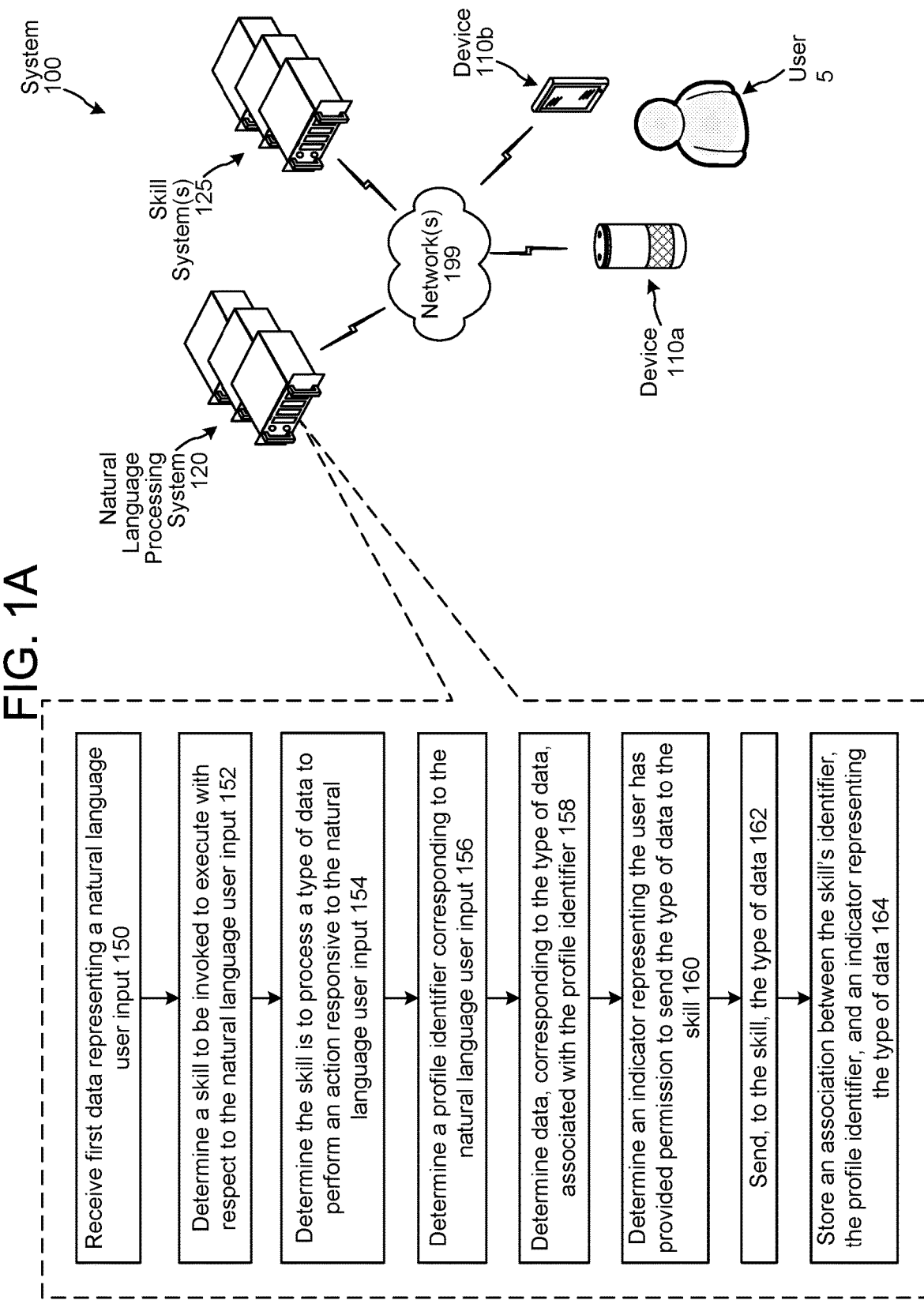

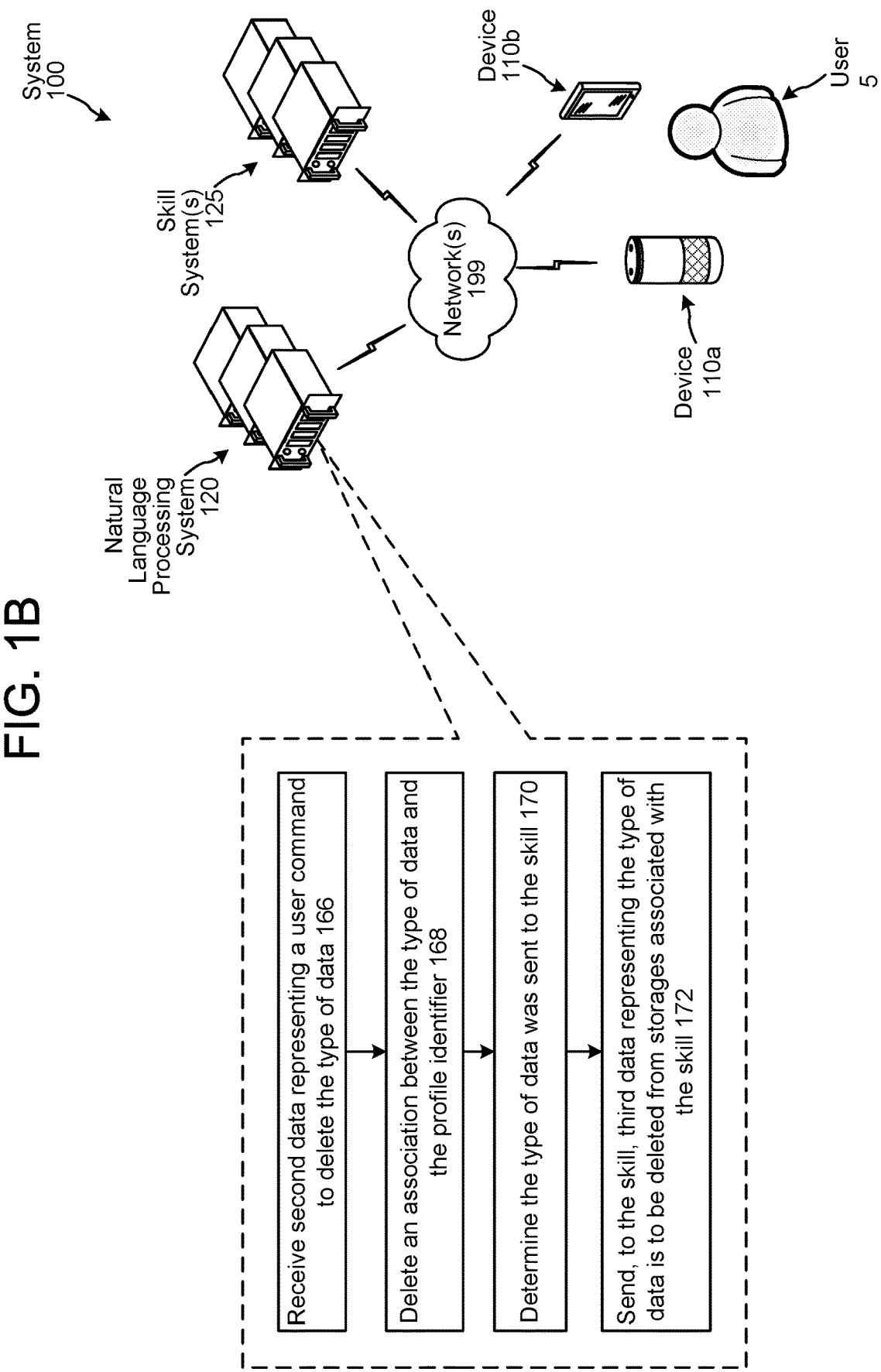

| User/Profile Identifier | Skill Identifier | Skill Maintained User/Profile Identifier | Data type | Data |
|---|---|---|---|---|
| 123 | 1234 | abc | Type A Information | Date of birth |
| 234 | 2345 | 234 | Type C Information | Blood pressure, heart rate |
| 234 | 3456 | bcd | Type B Information | Child name |
| 345 | 4567 | 345 | Type A Information | Name, date of birth, gender |

Data type Storage 285

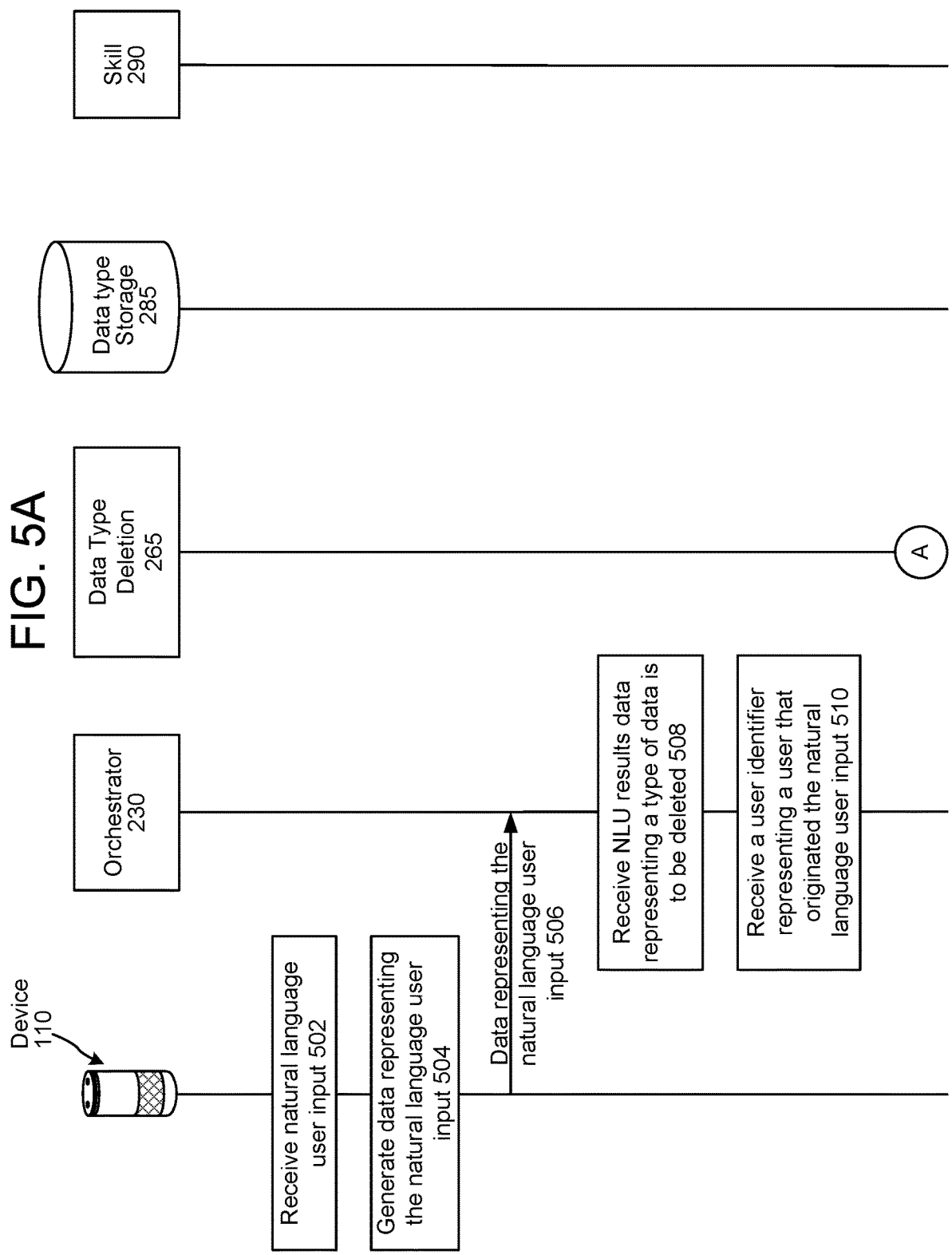

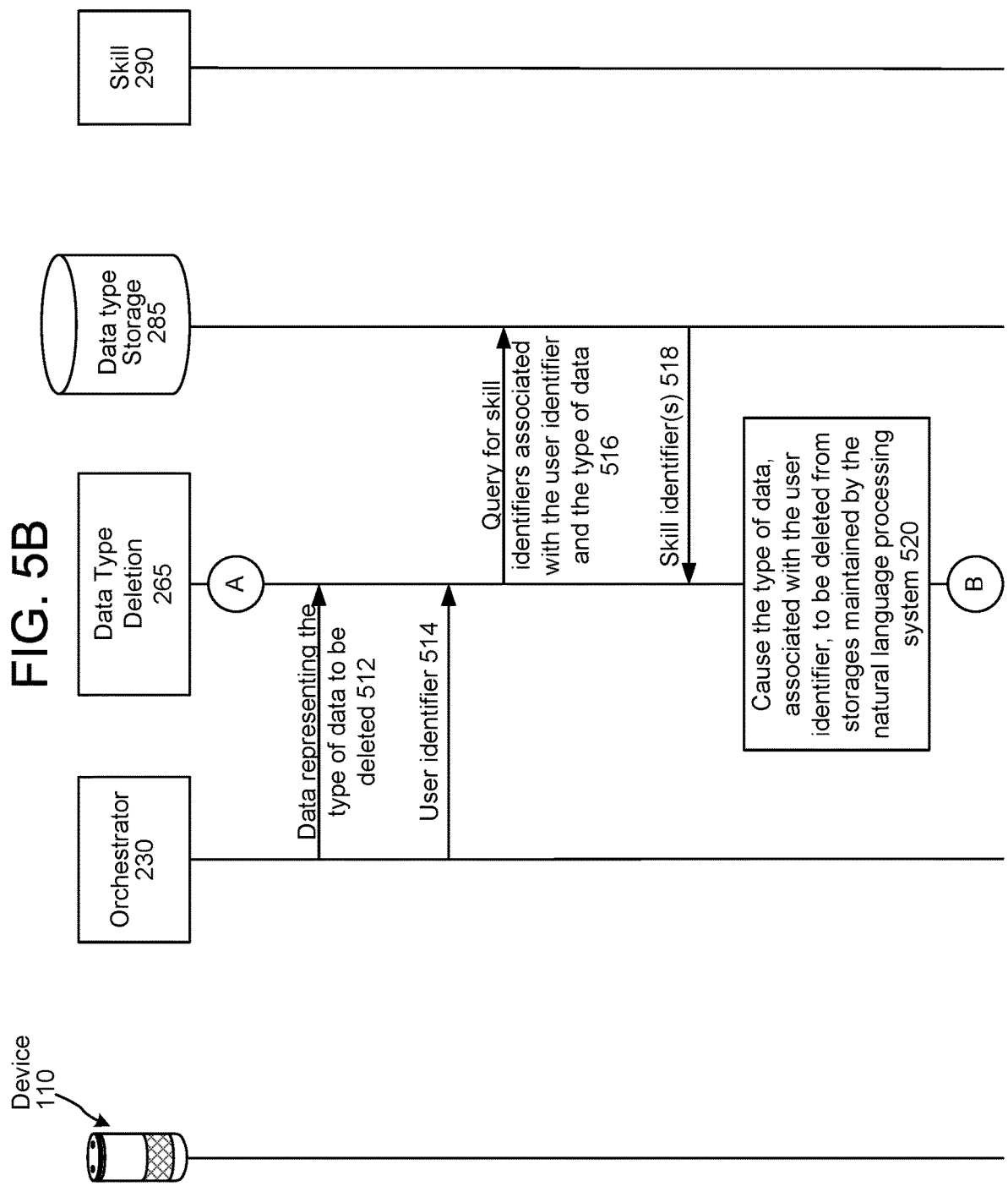

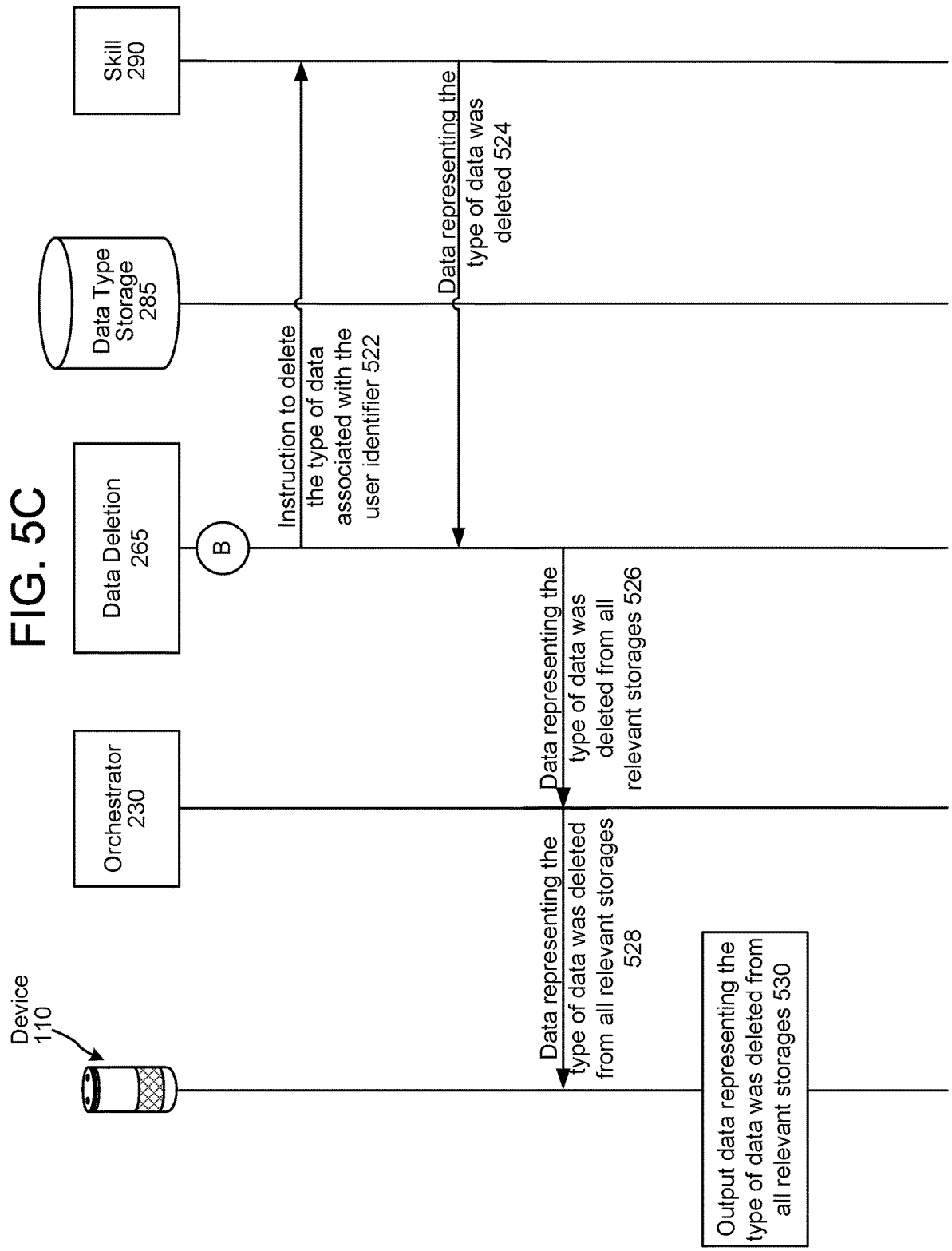

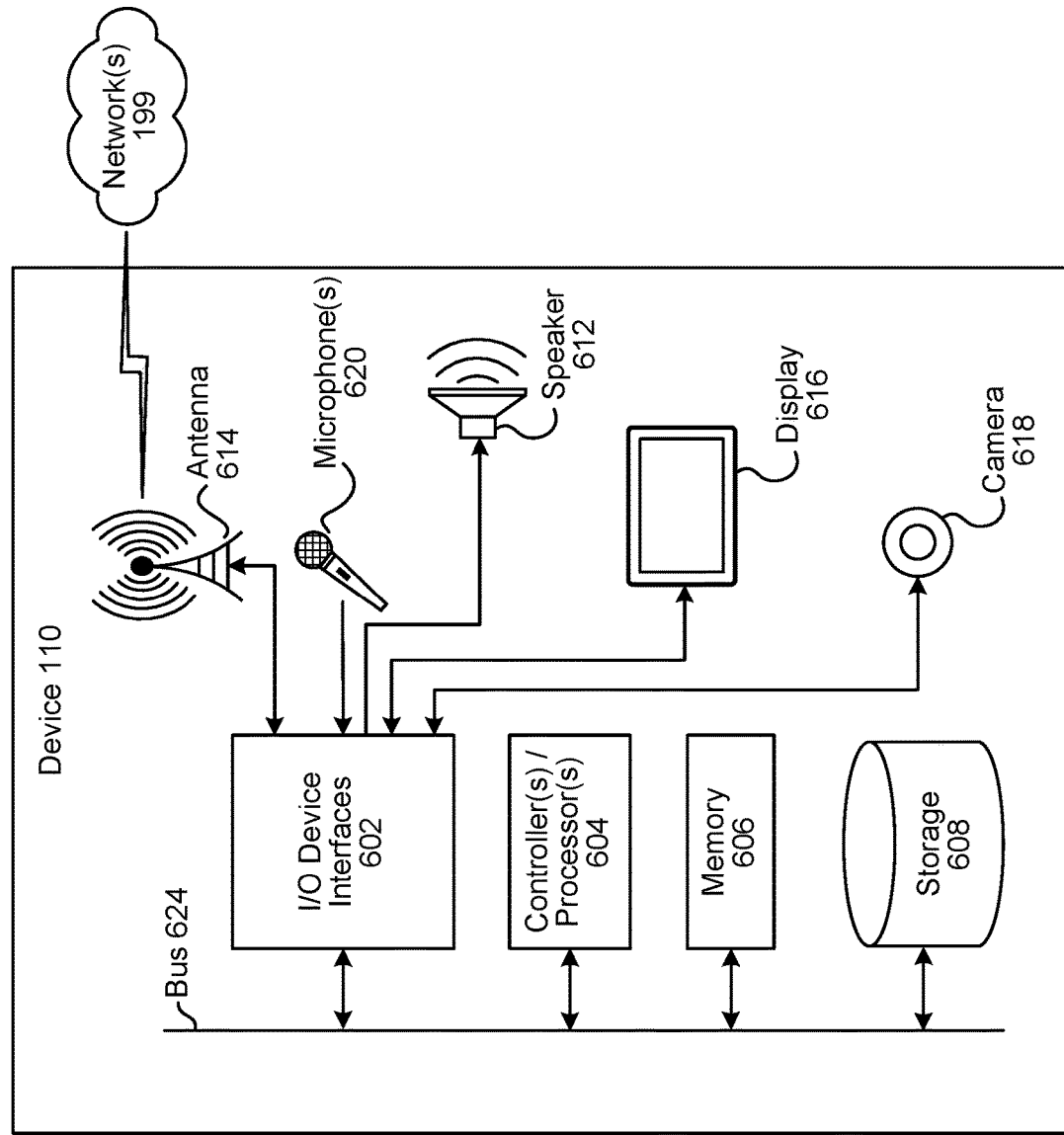

CONTROLLED ACCESS TO DATA

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system for tracking types of data of users, in accordance with embodiments of the present disclosure.

FIG. 1B illustrates a system for deleting types of data of users, in accordance with embodiments of the present disclosure.

FIG. 5A through 5C are a signal flow diagram illustrating a manner in which a data type may be deleted in response to a user command, in accordance with various embodiments of the present disclosure.

FIG. 6 is a block diagram conceptually illustrating example components of a device, in accordance with embodiments of the present disclosure.

DETAILED DESCRIPTION

Figure 2:
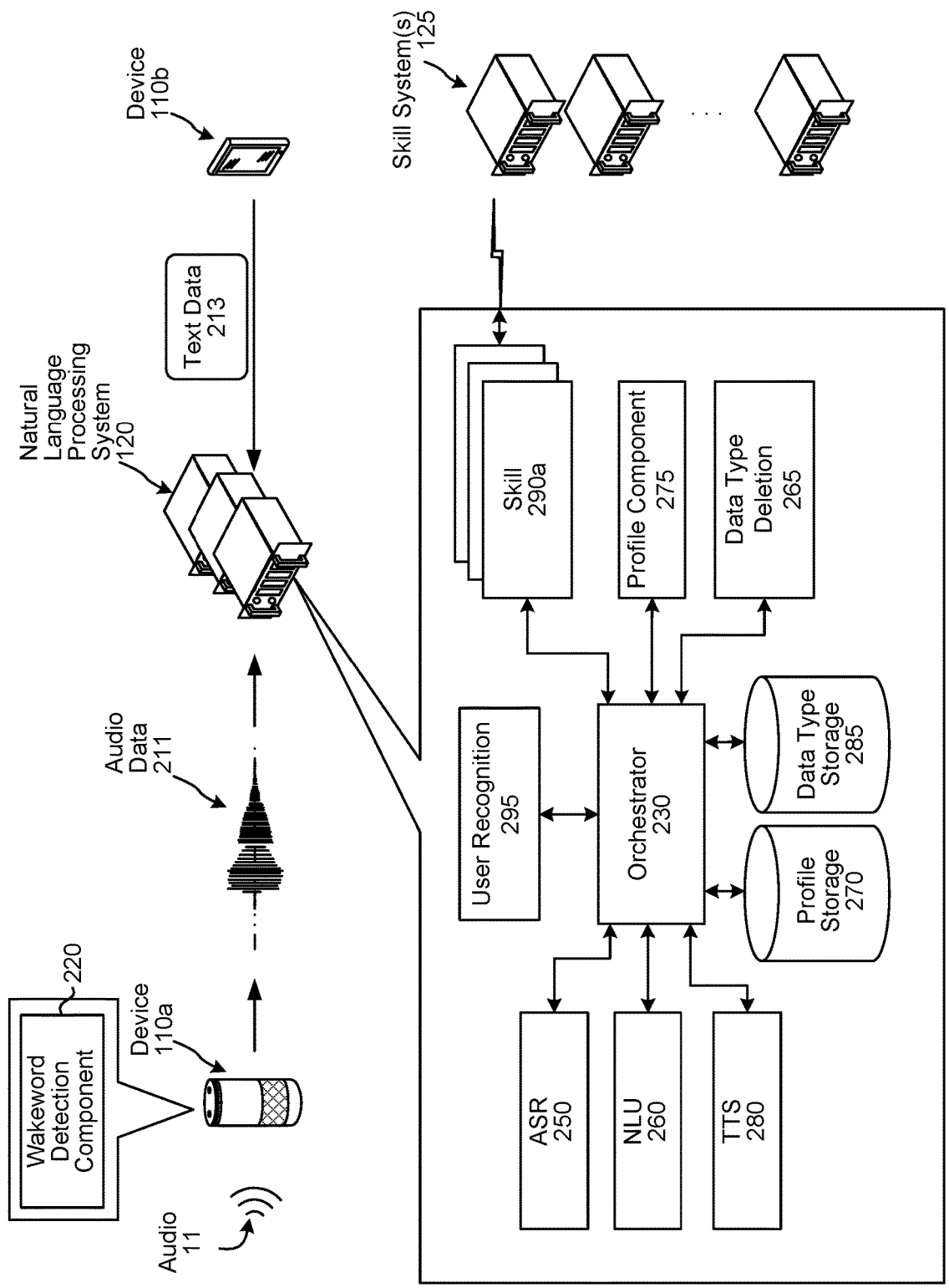
FIG. 2 is a conceptual diagram of components of a system, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A natural language processing system may be configured to perform actions in response to natural language user inputs. For example, for the user input of "play Adele music," a natural language processing system may output music sung by an artist named Adele. For further example, for the user input of "turn on the lights," a natural language processing system may turn on "smart" lights associated with the user's profile.

A natural language processing system may implement or communicate with one or more skills configured to perform actions responsive to natural language user inputs. As used herein, a skill may refer to software, hardware, and/or firmware running on a system that enables the system to execute specific functionality in order to provide data or produce some other output in response to a natural language input. In at least some examples, a skill may be server-based or cloud-based. In at least some other examples, a skill may be akin to a software application running on a traditional computing device. Example skills may include weather information skills, music playing skills, or the like. The functionality described herein as a skill may be referred to using many different terms, such as an action, bot, app, or the like.

A user may provide a natural language processing system with a type of data for the purpose of enabling the natural language processing system (and by extension one or more skills) to provide personalized responses to natural language user inputs of the user. For example, a user may provide a natural language processing system with health data to be used by a health care skill that can track and/or analyze the user's information to perform various tasks that the user may request. Thereafter, when the natural language processing system receives a natural language user input from that user, the natural language processing system may send the type of data (with the user's permission, for example as represented in a user profile corresponding to the user) to a skill to enable the skill to perform an action responsive to the natural language user input in view of the type of data. For further example, a user may provide a natural language processing system with a type of data along with a corresponding instruction to send the type of data to a skill for storage. In this example, the natural language processing system (with the user's permission) may or may not store a record of the type of data sent to the skill.

In at least some examples, a user may provide a type of data directly to a skill without using the natural language processing system as an intermediary.

In at least some examples, a user may provide a natural language processing system and/or skill with permission to aggregate the user's data, corresponding to a type of data, from various sources for the purposes of providing more informed responses to that user's natural language user inputs.

A user may provide a type of data through a graphical user interface, voice user interface, via active monitoring by a wearable device, etc.

As used herein, a type of data may correspond to "sensitive data," which may include, but is not limited to, personal health information (PHI) including but not limited to doctor office visit records and health information collected by a wearable device, information covered by the Family Education Rights and Privacy Act (FERPA), information covered by the European Union General Data Protection Regulation (GDPR), user information (e.g., such as information that may be stored in a user profile) and other sensitive information such as date of birth, gender, race, age, communications information (e.g., emails, text messages, audio messages, etc.), electronic calendar information, waveform data corresponding to spoken natural language user inputs received by a natural language processing system, and the like.

The present disclosure describes various examples in which sensitive data is tracked and deleted. Nonetheless, one skilled in the art will appreciate that the data tracking and deletion techniques described herein may apply to other types of data not explicitly encompassed within the definition of "sensitive data" provided herein.

Data types may correspond to different domains. As used herein, a "domain" may refer to a grouping of like functionality provided by a natural language processing system. Example domains include smart home, music, video, flash briefing, shopping, and custom (e.g., functionality that is not associated with any pre-configured domain). For example, a smart home domain may correspond to data representing user smart home interactions (e.g., the unlocking and locking of doors, the turning on and off of smart lights, etc.). For further example, the shopping domain may correspond to data representing a user's purchase history.

The present disclosure provides techniques for tracking where types of data have been sent (and optionally stored), as well as techniques for ensuring data types are deleted, from all applicable locations, in response to a user request to delete its data. In an example, sensitive data may be deleted in response to a user request to delete its sensitive data. In at least some embodiments, a natural language processing system may cause a skill, in communication with but not implemented by the natural language processing system, to delete data of a type corresponding to a user's deletion request.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A shows a system 100 configured to track data types. Although the figures and discussion illustrate certain operational steps of the system 100 in a particular order, the steps described may be performed in a different order (as well as certain steps removed or added) without departing from the intent of the disclosure. As shown in FIG. 1A, the system 100 may include one or more devices 110 local to a user 5, a natural language processing system 120, and a skill system(s) 125 connected across one or more networks 199.

The device 110a may receive audio corresponding to a spoken natural language user input originating from the user 5. The device 110a may generate audio data corresponding to the audio and may send the audio data to the natural language processing system 120. Alternatively, the device 110b may receive a text-based natural language user input from the user 5. The device 110b may generate text data corresponding to the text and may send the text data to the natural language processing system 120.

The device 110 may send the audio data and/or text data to the natural language processing system 120 via a companion application installed on the device 110. A companion application may enable the device 110 to communicate with the natural language processing system 120 via the network(s) 199. An example companion application is the Amazon Alexa application that may be installed on a smart phone, tablet, or the like.

The natural language processing system 120 may receive (150) first data (e.g., audio data or text data) representing the natural language user input. The natural language processing system 120 may determine (152) a skill (e.g., implemented by a skill system 125) that is to be invoked to execute with respect to the natural language user input (e.g., to perform an action responsive to the natural language user input).

The natural language processing system 120 may determine (154) the skill is to process a type of data to perform an action responsive to the natural language user input. The natural language processing system 120 may determine such based on substance of the natural language user input. For example, the natural language processing system 120 may determine an NLU intent representing the natural language user input. Based on the NLU intent, the natural language processing system 120 may determine a type of data is to be sent to the skill. The natural language processing system 120 may additionally or alternatively determine the skill is to process a type of data based on data received from the skill. For example, the natural language processing system 120 may determine NLU results data representing the natural language user input. The natural language processing system 120 may send the NLU results data to the skill. Thereafter, the natural language processing system 120 may receive, from the skill, data requesting the type of data be sent to the skill for processing with respect to the already sent NLU results data.

The natural language processing system 120 may determine (156) a profile identifier corresponding to the natural language user input (e.g., corresponding to the user). The natural language processing system 120 may determine (158) data, corresponding to the type of data, associated with the profile identifier.

The natural language processing system 120 may determine (160) an indicator representing the user has provided permission to the natural language processing system 120 to send the type of data to the skill. The indicator may be associated with the profile identifier, a skill identifier corresponding to the skill, and the data type.

Thereafter, the natural language processing system 120 may send (162), to the skill, the type of data. The natural language processing system 120 may store (164) an association between the skill's identifier, the profile identifier, and an indicator representing the data type.

Sometime after the natural language processing system 120 sends the type of data to the skill and stores the association, the natural language processing system 120 may receive (166) second data representing a user command to delete the type of data. The second data may, in at least some examples, be audio data representing a spoken natural language user input to delete the type of data. In at least some other examples, the second data may be text data representing a text-based natural language user input to delete the type of data.

The natural language processing system 120 may, after receiving the second data, delete (168) an association between the type of data and the profile identifier. This may effectively disassociate the type of data from the user with respect to future processing performed by the natural language processing system 120.

The natural language processing system 120 may, using the association stored at step 164, determine (170) data, corresponding to the type of data, has been sent to the skill. The natural language processing system 120 may thereafter send (172), to the skill, data representing the data, corresponding to the type of data, is to be deleted from storages associated with the skill.

While the present disclosure is described with respect to user commands to delete types of data, the present disclosure is not limited thereto. For example, teachings of the present disclosure may apply to user commands to update types of data. In at least some examples, updating a type of data may include deleting a previous version of the type of data. The teachings disclosed herein may be performed to delete previous versions of a type of data.

A type of data may be provided to the natural language processing system 120 (for storage or for performing an action) via a voice user interface (VUI), via a graphical user interface (GUI), or the type of data may be generated from a device (e.g., a device that measures a user's blood pressure, a device that measures a user's glucose level, etc.) without a corresponding user input. Such data may correspond to the first data discussed with respect to step 150 above.

Further details of the system 100 configured to track and delete types of data of users are explained below, following a discussion of the overall system 100 of FIG. 2. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the natural language processing system 120. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the natural language processing system 120. The audio data 211 may include data corresponding to the wakeword, or the device 110*a* may remove the portion of the audio corresponding to the wakeword prior to sending the audio data 211 to the natural language processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based natural language user input. The device 110*b* may generate text data 213 representing the text-based natural language user input.

The device 110a may send the text data 213 to the natural language processing system 120. The orchestrator component 230 may receive the text data 713.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the natural language processing system 120, a skill 290, a skill system 125, etc.) to execute the intent. For example, if the text data corresponds to "play Adele music," the NLU component 260 may determine an intent that the natural language processing system 120 output music and may identify "Adele" as an artist. For further example, if the text data corresponds to "what is the weather," the NLU component 260 may determine an intent that the natural language processing system 120 output weather information associated with a geographic location of the device 110. In another example, if the text data corresponds to "turn off the lights," the NLU component 260 may determine an intent that the natural language processing system 120 turn off lights associated with the device(s) 110 or the user(s) 5. The NLU component 260 may output NLU results data (which may include tagged text data, indicators of intent, etc.).

As described above, the natural language processing system 120 may perform speech processing using two different components (e.g., the ASR component 250 and the NLU component 260). One skilled in the art will appreciate that the natural language processing system 120, in at least some examples, may implement a spoken language understanding (SLU) component that is configured to process the audio data 211 to generate NLU results data.

In some examples, the SLU component may be equivalent to the ASR component 250 and the NLU component 260. For example, the SLU component may process the audio data 211 and generate NLU data. The NLU results data may include intent data and/or slot data. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take the audio data 211 representing natural language speech and attempt to make a semantic interpretation of the natural language speech. That is, the SLU component may determine a meaning associated with the natural language speech and then implement that meaning. For example, the SLU component may interpret the audio data 211 representing natural language speech from the user 5 in order to derive an intent or a desired action or operation from the user 5. In some examples, the SLU component outputs a most likely NLU hypothesis recognized in the audio data 211, or multiple NLU hypotheses in the form of a lattice or an N-best list with individual hypotheses corresponding to confidence scores or other scores (such as probability scores, etc.).

The natural language processing system 120 may include one or more skills 290. A "skill" may be software running on the natural language processing system 120 that is akin to a software application running on a traditional computing device. That is, a skill 290 may enable the natural language processing system 120 to execute specific functionality in order to provide data or produce some other requested output. The natural language processing system 120 may be configured with more than one skill 290. For example, a weather service skill may enable the natural language processing system 120 to provide weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 290 may operate in conjunction between the natural language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the natural language processing system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 290 dedicated to interacting with more than one skill system 125.

Unless expressly stated otherwise, reference herein to a "skill" may include a skill 290 operated by the natural language processing system 120 and/or skill operated by a skill system 125. Moreover, the functionality described herein as a skill may be referred to using many different terms, such as an action, bot, app, or the like.

The natural language processing system 120 may include a TTS component 280. The TTS component 280 may generate audio data (e.g., synthesized speech) from text data using one or more different methods. Text data input to the TTS component 280 may come from a skill 290, a skill system 125, the orchestrator component 230, or another component of the natural language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include a user recognition component 295 that recognizes one or more users associated with data input to the natural language processing system 120. The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the natural language processing system 120 in correlation with a user input, to stored biometric data of users. The user recognition component 295 may additionally or alternatively perform user recognition by comparing image data (e.g., including a representation of at least a feature of a user), received by the natural language processing system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the natural language processing system 120 and/or other systems.

The natural language processing system 120 may include profile storage 270. The profile storage 270 may include a variety of information related to individual users, groups of users, devices, etc. that interact with the natural language processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith.

Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The natural language processing system 120 may also include a profile component 275. The profile component 275 may be configured to access and process profile data stored in the profile storage 270. The profile component 275 may additionally or alternatively be configured to write profile data to the profile storage 270.

Figure 3:
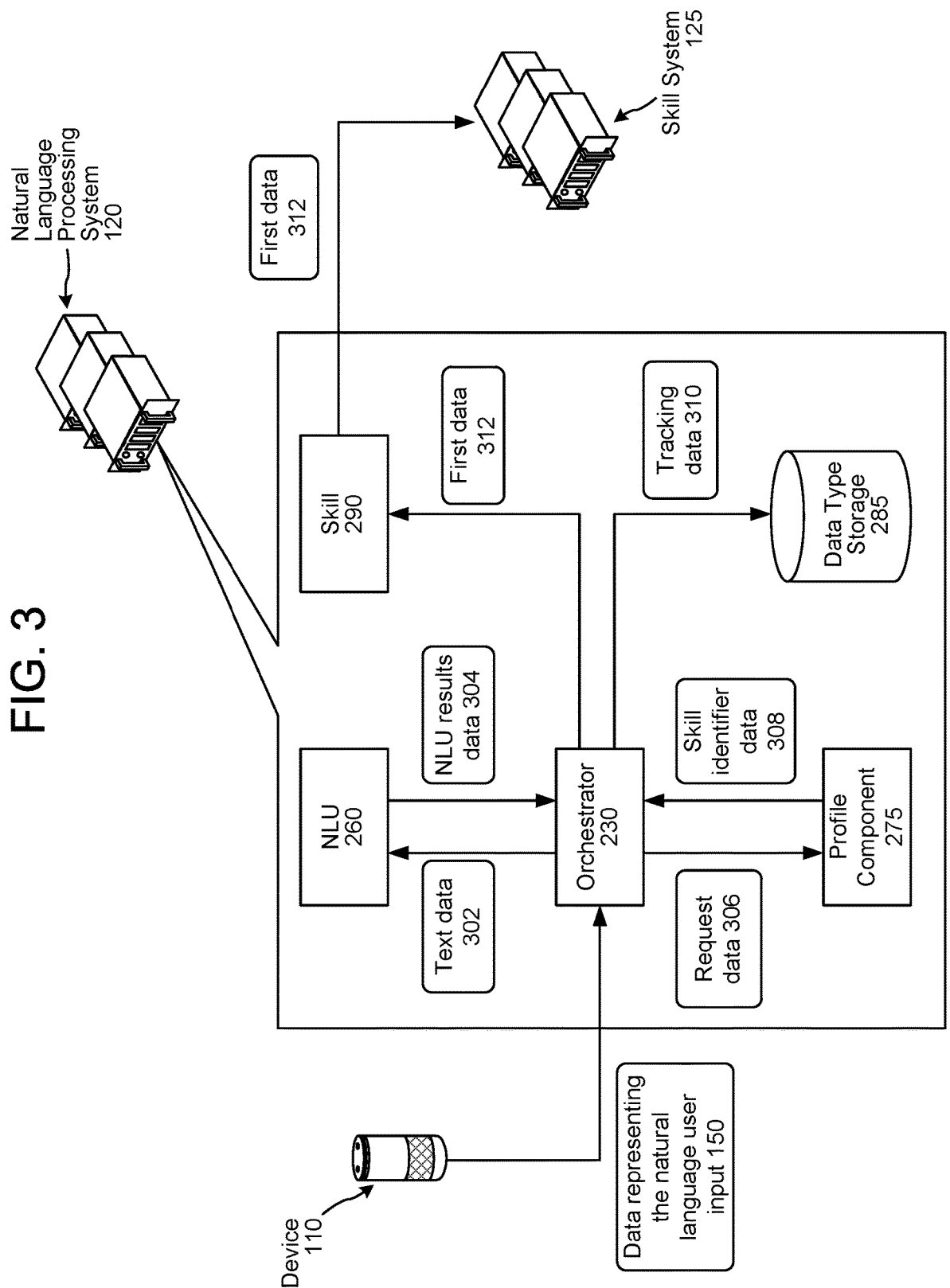
FIG. 3 is a conceptual diagram illustrating how a natural language processing system may process a natural language user input including a type of data, in accordance with embodiments of the present disclosure.

FIG. 3 illustrates how the natural language processing system 120 may process, at runtime, a natural language user input including sensitive data. A device 110 may receive a natural language user input. The natural language user input may be a spoken natural language user input or a text-based natural language user input. If the natural language user input is a spoken natural language user input, the device 110 may send (150), to the orchestrator component 230, audio data representing the spoken natural language user input. If the natural language user input is a text-based user input, the device 110 may send (150), to the orchestrator component 230, text data representing the text-based natural language user input.

If the orchestrator component 230 receives audio data representing a spoken natural language user input, the orchestrator component 230 may cause the ASR component 250 to generate text data representing the spoken natural language user input in the audio data. The orchestrator component 230 may send, to the NLU component 260, text data 302 (either received at step 302 or as generated by the ASR component 250) representing the natural language user input.

The NLU component 260 may perform NLU processing on the text data to generate NLU results data. Part of this NLU processing may include entity resolution processing, whereby an entity, represented in the text data, is processed to corresponding to an entity known to the natural language processing system 120. In at least some examples, the natural language processing system 120 may include one or more entity resolution services, which may be implemented separately from the NLU component 260. In at least some examples, each entity resolution service may correspond to a different domain. In such examples, the NLU component 260 may determine a domain to which the natural language user input most likely corresponds, and may send the text data 302 (or a tagged and slotted representation thereof) to an entity resolution service corresponding to the domain. The entity resolution service may resolve one or more tagged entities represented in the text data 302 sent to the entity resolution service. Thereafter, the entity resolution service may send, to the NLU component 260, text data representing the resolved entities. The NLU component 260 may incorporate the received text data into NLU results data 304 representing the natural language user input. The NLU component 260 may send the NLU results data 304 to the orchestrator component 230.

The orchestrator component 230 may determine the NLU results data includes sensitive data (or represents a user command to send sensitive data to a skill). Thereafter, the orchestrator component 230 may determine a profile identifier corresponding to the natural language user input. In at least some examples, the orchestrator component 230 may receive a user identifier(s) from the user recognition component 295, and may determine a profile identifier associated with the user identifier (or top scoring user identifier if more than one user identifier is received from the user recognition component 295). The orchestrator component 230 may send, to the profile component 275, request data 306 representing the profile identifier, the NLU results data (or a portion thereof, such a portion representing an a domain to which the natural language user input corresponds), and an instruction to provide skill identifiers that are associated with the profile identifier and that correspond to the NLU results data (or portion thereof).

The profile component 275 may communicate with the profile storage 270. The profile component 275 may determine profile data, in the profile storage 270, associated with the profile identifier. The profile component 275 may then determine, in the profile data, one or more skill identifiers corresponding to the NLU results data (or a portion thereof). In at least some examples, the profile component 275 may determine one or more skill identifiers corresponding to a domain represented in the NLU results data (or the portion thereof). The profile component 275 may send, to the orchestrator component 230, skill identifier data representing the one or more skill identifiers determined by the profile component 275.

In at least some examples, the request data 306 may include a portion representing sensitive data is to be sent to a skill. In such examples, the profile component 275 may determine a subset, of the determined one or more skill identifiers, associated with indicators representing the user has provided permission for the user's sensitive data to be sent to skills corresponding to the subset of skill identifiers. In such examples, only this subset of skill identifiers may be represented in the skill identifier data 308.

The orchestrator component 230 may select, from among the skill identifiers represented in the skill identifier data 308, a skill identifier corresponding to a skill 290 to be invoked with respect to the natural language user input. The orchestrator component 230 may send, to the skill 290 corresponding to the selected skill identifier, first data 312 representing at least a portion of the NLU results data 304. The skill 290 may then perform processing based on the received at least a portion of the NLU results data 304.

In at least some examples, the first data 312 may include metadata representing the at least a portion of the NLU results data corresponds to a type of data (e.g., sensitive data). This metadata enables the skill 290 to maintain a record of the types of data it has received and stored.

In at least some examples, the orchestrator component 230 may select, from among the skill identifiers represented in the skill identifier data 308, a skill identifier corresponding to a skill system 125. When this occurs, the orchestrator component 230 may send the first data 312 to a skill 290 associated with the domain corresponding to the at least a portion of the NLU results data 304 represented in the first data 312. In turn, the skill 290 may send the first data 312 to the skill system 125. In another example, the orchestrator component 230 may send the first data 312 to a skill 290 configured to communicate with various skill systems, which may correspond to different domains. In turn, the skill 290 may send the first data 312 to the skill system 125 corresponding to the skill identifier selected by the orchestrator component 230.

To facilitate the skill 290 sending first data 312 to the appropriate skill system 125, the orchestrator component 230 may send, to the skill 290, the skill identifier selected by the orchestrator component 230. The skill 290 may then send the first data 312 to the skill system 125 corresponding to the received skill identifier.

The skill 290 or skill system 125 may store received sensitive data in storage associated with the skill 290 or skill system 125 (e.g., storage that is not controlled by the orchestrator component 230).

Sometime after the orchestrator causes NLU results data, including sensitive data, to be sent to a skill 290 or skill system 125, a user corresponding to the sensitive data may want the sensitive data to be deleted. As a result, it may be beneficial for the system 120 to maintain a record of sensitive data and where the sensitive data was sent. Such record will enable the system 120 to ensure sensitive data is deleted from a skill's or skill system's storage when a user requests such deletion.

To this end, the orchestrator component 230 may cause tracking data 310 to be stored in a data type storage 285. The tracking data 310 may include the sensitive data sent to the skill 290 or skill system 125 (or a representation of the sensitive data sent the skill 290 or skill system 125); a user identifier and/or profile identifier corresponding to a user as recognized by the user recognition component 295; and the skill identifier corresponding to the skill 290 or skill system 125 that received the sensitive data.

Figure 4:
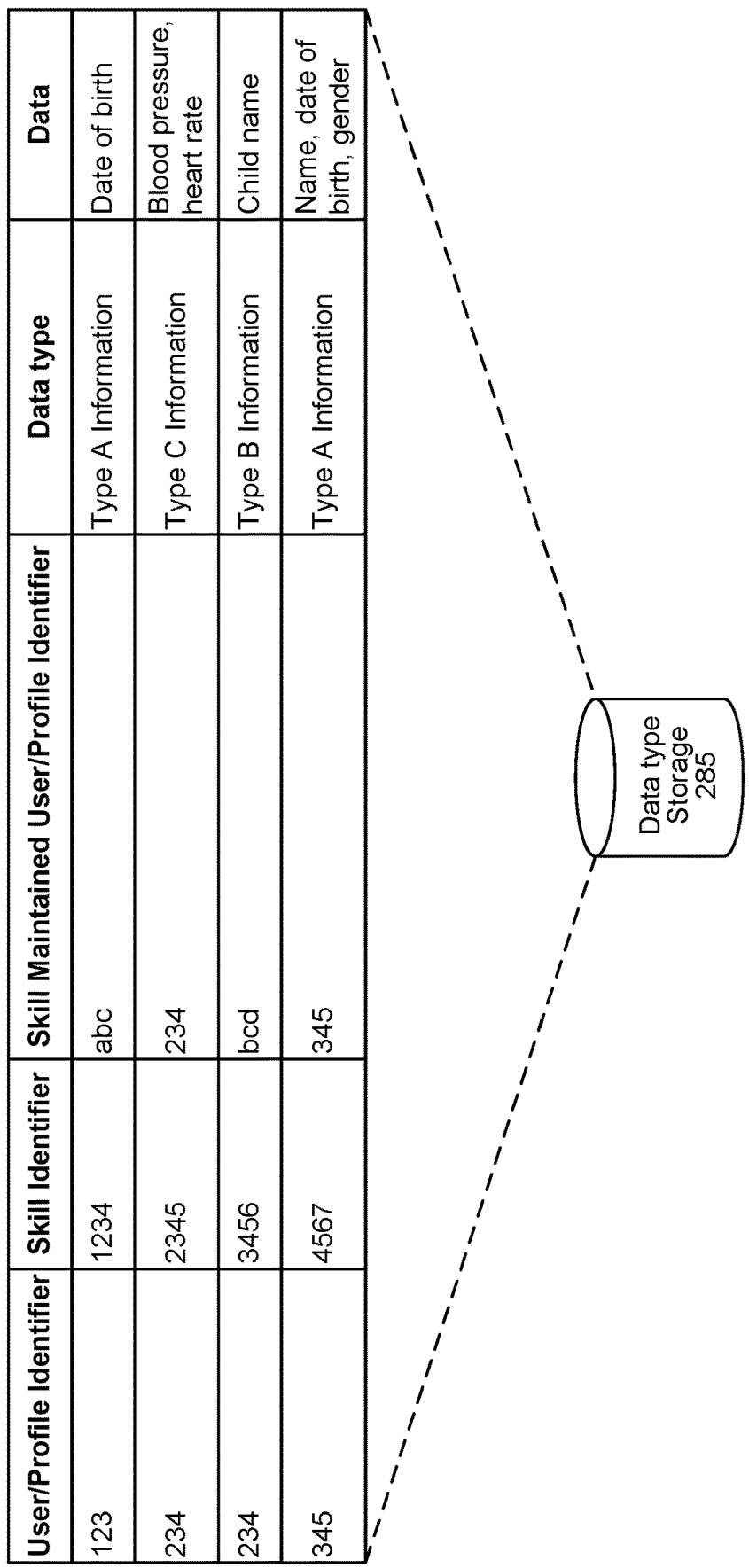
FIG. 4 illustrates an example of how a data type may be stored and associated in a sensitive data storage, in accordance with embodiments of the present disclosure.

FIG. 4 illustrates an example of how data may be stored and associated in the data type storage 285. As illustrated in FIG. 4, associated data may include a user identifier and/or profile identifier, a skill identifier that received data corresponding to the user identifier and/or profile identifier, a type representing the data that was sent to the skill corresponding to the skill identifier, and/or the particular data that was sent. A portion of related data in the data type storage 285 may also include a skill maintained user identifier and/or profile identifier. This identifier may correspond to the user but may be the same as or different from the user's profile identifier as represented in the profile storage 270. For example, the natural language processing system 120 and the skill may maintain separate user profiles for the same user. The natural language processing system 120 may know the identifier used by the skill so the natural language processing system 120 can indicate NLU results data, sent to the skill, corresponding to a particular profile maintained by the skill. However, the skill may not be privy to the user identifier and/or profile identifier used by the natural language processing system 120 to track processing with respect to the user. This configuration may maintain user privacy (e.g., may prevent the skill from gaining unauthorized access to user data based on the skill known the user's identifier as maintained by the natural language processing system 120).

This partitioning of data, in the data type storage 285, may be useful in causing specific data types to be deleted in response to a user command. This may be beneficial because different data types may be handled differently. For example, child-specific information may become unassociated with an adult user's profile once the child reaches a certain age. For further example, personal health information may be stored and deleted in one manner, while biographic/personal information may be stored and deleted in another manner. Manners in which types of data may be stored and deleted may be separately controlled by a user and may require separate authorization for storage by and/or sharing with skills.

Some natural language processing systems may include a system usage storage that stores data related to processing of natural language user inputs. The system usage storage may include the types of data represented in the aforementioned sensitive data storage, as well as other data related to processing of a natural language user input. For example, for a given natural language user input, the system usage storage may store a user identifier and/or profile identifier, a waveform of a spoken natural language user input, ASR results data, NLU results data, a skill identifier, and/or other data used or generated by the natural language processing system during processing of a natural language user input. The natural language processing system may use indicators (e.g., flags) to represent, in the system usage storage, when a natural language user input resulted in sensitive data being sent to a skill or skill system.

Once the natural language processing system determines a portion of data, corresponding to processing of a natural language user input, corresponds to sensitive data, the natural language processing system may assign a sensitive data indicator to each portion of data associated with the natural language user input in the system usage storage. For example, the natural language processing system may store waveform audio data corresponding to a spoken natural language user input. As a result of NLU processing of the spoken natural language user input, the natural language processing system may determine the natural language user input includes sensitive data. As a result of such a determination, the natural language processing system may cause a sensitive data indicator to be associated, in the system usage storage, with NLU results data (representing the foregoing NLU processing) as well as the corresponding waveform audio data. Moreover, as a result of such a determination, the natural language processing system may cause a sensitive data indicator to be associated with subsequently generated data corresponding to processes performed with respect to the same natural language user input. For example, if the natural language processing system generates audio data from TTS processing, and the generated audio data corresponds to a system output with respect to the natural language user input, the natural language processing system may associate the generated audio data with the sensitive data indicator. Other examples of cascading sensitive data indicator to various portions of data associated with processing of a natural language user input are possible.

In at least some examples, a natural language processing system may classify skills based on the type of data the skills are configured to receive, process, and/or provide to the natural language processing system. For example, the natural language processing system may classify a skill based on the type(s) of sensitive data the skill is configured to receive, process, and/or provide. The natural language processing system may use such classifications to determine when data, in the system usage storage is to be associated with a sensitive data indicator. For example, the natural language processing system may determine a skill should be invoked to execute with respect to a natural language user input. The natural language processing system may thereafter determine the skill corresponding to a "sensitive data skill," or more particularly a specific type of sensitive data skill such as a "PHI skill." As a result, the natural language processing system may associate previously processed and generated data, corresponding to the natural language user input in the system usage storage, with a sensitive data indicator. The natural language processing system may also, as a result, associate data, thereafter received from the skill with respect to the natural language user input, with the sensitive data indicator in the system usage storage.

A user may provide permission for a skill to send sensitive data to one or more other skills. For example, a user may provide permission for a diabetes monitoring skill to receive carbohydrate intake data from a first skill, glucose level data from a second skill, and/or weight data from a smart scale skill, etc. The aforementioned labeling of data provided from a skill as being sensitive data permits a natural language processing system to maintain records of sensitive data that is sent between skills and, as a result, enables the sensitive data to be later deleted in response to a user command (as described in detail herein).

Different types of indicators may be used. For example, each type of sensitive data may be associated with a different indicator. This enables users to issue different types of deletion instructions. In other word, a user cause one or more particular types of sensitive data to be deleted, without being required to delete other types of sensitive data of the user stored by the natural language processing system, a skill, and/or a skill system. For example, a natural language processing system, a skill, and/or a skill system may store PHI and FERPA governed sensitive data of a user. By using the foregoing indicators, a user is able to cause one of the types of sensitive data (e.g., PHI or FERPA governed data) to be deleted while permitting the other type of sensitive data to remain stored.

As discussed above, data stored in the data type storage 285 and/or a system usage storage may be characterized based on the type of sensitive data. As described, the type may corresponding to PHI data, FERPA governed data, etc. One skill in the art will appreciate that sensitive data may be characterized in other manners. For example, types of sensitive data may be represented as sensitive, highly sensitive, or the like.

The orchestrator component 230 may send, to the skill 290 or skill system 125, data representing the type of sensitive data sent to the skill 290 or skill system 125. The skill 290 or skill system 125 may associate received sensitive data with a corresponding sensitive data type in a storage maintained by the skill 290 or skill system 125. For example, the storage, maintained by the skill 290 or skill system 125 may be configured like the data type storage 285, as illustrated in FIG. 4, except the storage, maintained by the skill 290 or skill system 125, may not include the skill identifier column or the user/profile identifier column. In other words, a section of related data in the storage, maintained by the skill 290 or skill system 125, may include a profile identifier corresponding to a user profile maintained by the skill (which may be different from the profile identifier corresponding a user profile in the profile storage 270 and which corresponds to the same user), sensitive data, and a type of the sensitive data.

Referring back to FIG. 3, in at least some examples, a user may have a profile (e.g., a use profile) stored by the skill 290 or skill system 125. The user may also store sub-profiles with the skill 290 or skill system 125. For example, the sub-profiles may correspond to child profiles encompassed under an adult user's profile. For further example, a profile may correspond to a caregiver profile and a corresponding sub-profile may correspond to an individual receiving the caregiving. When the user creates a sub-profile with the skill 290 or skill system 125, the skill 290 or skill system 125 may send data representing the sub-profile to the orchestrator component 230. The orchestrator component 230 may send the received data to the profile component 275. The profile component 275 may cause the data to be associated with the user's profile in the profile storage 270 (e.g., resulting in a profile hierarchy in the profile storage 270 that mimics the profile hierarchy stored by the skill 290 or skill system 125). The sub-profile, as stored by the profile storage 270 and the skill 290 or skill system 125, may be associated with the same profile identifier. This profile identifier may be used, as discussed in detail below, to later delete sensitive data.

The foregoing discusses ways in which sensitive data may be sent to a skill. The foregoing also discusses ways in which the sending of sensitive data to skills may be tracked. The following describes ways in which sensitive data may be deleted in response to a user command.

First, it should be noted that the natural language processing system 120 may be configured to receive and execute with respect to different types of deletion commands. A first type of deletion command may relate to all of the user's sensitive data. Such a deletion command may correspond to natural language user inputs of "delete my sensitive data," "delete my data," or the like. A user may also provide a deletion command that is specific to a subset of the user's sensitive data. For example, if the natural language processing system tracks sensitive data based on sensitive data type (as described above), a user may provide deletion commands specific to one or more, but not all, of the different types of the user's sensitive data that is tracked by the natural language processing system 120. For example, the natural language processing system 120 may track PHI data and FERPA governed data of a user. In this example, the user could instruct the natural language processing system 120 to delete all of the user's tracked sensitive data, only the user's tracked PHI data, or only the user's tracked FERPA governed data. One skilled in the art will appreciate that the types of deletion commands that a user may provide may depend on how the natural language processing system 120 is configured to track sensitive data.

The natural language processing system 120 and a skill 290 or skill system 125 may respond differently to deletion commands based on how the natural language processing system 120, and the skill 290 or skill system 125, are configured to communicate. In at least some examples, in response to receiving a deletion command, the natural language processing system 120 may simply instruct the skill 290 or skill system 125 to delete sensitive data (as illustrated in FIGS. 5A through 5C).

A device 110 may receive (502) a natural language user input. The natural language user input may be a spoken or text-based natural language user input. The device 110 may generate (504) data representing the natural language user input. If the natural language user input corresponds to speech, the generated data may be audio data representing the speech. If the natural language user input is text-based, the generated data may be text data. The device 110 may send (506), to the natural language processing system 120, and more particularly the orchestrator component 230, the data representing the natural language user input.

The orchestrator component 230 may, at some time after receiving the data from the device 110, receive (508), for example from the NLU component 260, NLU results data representing a type of sensitive data to be deleted. The type may correspond to all sensitive data, or a portion of sensitive data such as PHI, FERPA governed, etc.

The orchestrator component 230 may receive (510), for example from the user recognition component 295, a user identifier representing a user that originated the natural language user input.

Based on the NLU results data representing a type of sensitive data to be deleted, the orchestrator component 230 may send (512), to a data type deletion component 265 of the natural language processing system 120, data representing the type of sensitive data to be deleted. The orchestrator component 230 may also send (514), to the data type deletion component 265, the user identifier.

The data type deletion component 265 may query (516) the data type storage 285 (and/or a system usage storage) for skill identifiers associated with the user identifier and the type of sensitive data to be deleted. In turn, the data type deletion component 265 may receive (518) one or more skill identifiers associated with the user identifier and the type of sensitive data in the data type storage 285 (and/or the system usage storage).

The data type deletion component 265 may cause (520) the type of sensitive data, associated with the user identifier, to be deleted from storages maintained by the natural language processing system 120. This may include, but is not limited to, deleting the type of sensitive data from the data type storage 285 and/or the system usage storage described herein.

The data type deletion component 265 may send (522), to each skill 290 and/or skill system 125 associated with a skill identifier received at step 518, an instruction to delete the type of sensitive data associated with the user identifier. In at least some examples, the user identifier, sent to the skill(s) 290 and/or skill system(s) 125, may not be the same as the user identifier received at step 514. For example, referring back to FIG. 4, the user identifier received at step 514 may be a user identifier corresponding to a profile maintained by the natural language processing system 120, but the user identifier sent at step 522 may be a corresponding user identifier associated with a profile maintained by the skill 290 and/or skill system 125 receiving the deletion instruction. Thus, it will be appreciated that the user identifier, sent to a skill 290 or skill system 125 may be different from the user identifier sent to a different skill 290 or skill system 125 represented in the same skill identifiers received at step 518.

In other examples, instead of sending a user identifier at step 522, the data type deletion component 265 may send an instruction to delete sensitive data associated with a token. A token may be per user per skill/skill system token. That is, a token may associate a user profile (maintained by the natural language processing system 120) with a user profile (maintained by the skill 290 or skill system 125).

A skill 290 or skill system 125 may delete, from storage(s) maintained by the skill 290 or skill system 125, the type of sensitive data associated with the received user identifier. A skill 290 or skill system 125 may send (524), to the data type deletion component 265, data representing the type of sensitive data was deleted. The data type deletion component 265 may receive such "deletion confirmation data" from each skill 290 and/or skill system 125 to which the data type deletion component 265 sent a deletion instruction at step 522.

After the data type deletion component 265 receives deletion confirmation data from every skill 290 and/or skill system 125 to which the data type deletion component 265 sent a deletion instruction at step 522, the data type deletion component 265 may send (526), to the orchestrator component 230, data representing the type of sensitive data was deleted from all relevant storages (e.g., all storages including the type of sensitive data associated with the user).

The orchestrator component 230 may send (528), to the device 110 (or another device associated with the same profile), data representing the type of sensitive data was deleted from all relevant storages. This data may be text data or audio data (e.g., audio data representing synthesized speech generated by the TTS component 280). The device 110 may output (530) the received data.

As described, a skill 290 or skill system 125 may maintain storage storing sensitive user data and the data type deletion component 265 may instruct the skill 290 or skill system 125 to delete sensitive data from such storage. In at least some examples, the skill 290 or skill system 125 may provide the data type deletion component 265 (or another component of the natural language processing system 120) with a search interface into the storage maintained by the skill 290 or skill system 125. Such search interface may enable the data type deletion component 265 (or another component of the natural language processing system 120) to confirm that the skill 290 or skill system 125 in fact deletes sensitive data in response to receiving a deletion instruction. For example, after sending a deletion instruction to a skill 290 or skill system 125, the data type deletion component 265 (or other component of the natural language processing system 120) may query the storage (maintained by the skill 290 or skill system 125) for data associated with the user identifier included in the deletion instruction. In return, the data type deletion component 265 (or other component of the natural language processing system 120) may receive a search result representing whether the storage contains sensitive data associated with the user identifier (e.g., "no matching search results" may be received if the storage no longer contains data associated with the user identifier). The foregoing is a manner in which the natural language processing system 120 may ensure skills and skill systems comply with instructions of the natural language processing system 120.

Rather than a skill 290 or skill system 125 providing a component of the natural language processing system 120 with access to storage maintained by the skill 290 or skill system 125, a third party system may be given access to the storage. A "third party system" refers to a system that communicates with the natural language processing system 120 and the skill 290 or skill system 125, but that is not controlled by the natural language processing system 120 or the skill 290 or skill system 125. For example, the skill 290 or skill system 125 may provide the third party system with a search interface into the storage maintained by the skill 290 or skill system 125. For example, after sending a deletion instruction to a skill 290 or skill system 125, the data type deletion component 265 may notify the third party system of the user identifier and the skill 290 or skill system 125 to which the data type deletion component 265 sent the deletion instruction. The third party system may, in turn, query the storage (maintained by the skill 290 or skill system 125) for data associated with the user identifier included in the deletion instruction. In return, the third party system may receive a search result representing whether the storage contains sensitive data associated with the user identifier (e.g., "no matching search results" may be received if the storage no longer contains data associated with the user identifier). The third party system may, in turn, send the search results (or a representation thereof) to the data type deletion component 265. The foregoing may permit the natural language processing system 120 to confirm that sensitive data has been deleted by a skill 290 or skill system 125, while preventing the skill 290 or skill system 125 from needing to give the natural language processing system 120 access to the skill 290's or skill system 125's storage.

In at least some examples, the data type deletion component 265 may have access to a storage, maintained by a skill 290 or skill system 125, such that the data type deletion component 265 may delete sensitive data from the data store. In such examples, the steps of FIGS. 5A through 5C may be performed, except for steps 522 and 524. In place of steps 522 and 524, the data type deletion component 265 may send, to storage associated with each skill identifier received at step 518, an instruction to delete the type of sensitive data associated with the user identifier. As such, one skilled in the art will appreciate that rather than issuing the deletion instruction to the skill 290 or skill system 125 (as illustrated in FIG. 5C), the data type deletion component 265 may directly communicate with the skill's or skill system's storage to delete the relevant sensitive data.

To enable one or more of the above examples in which the natural language processing system 120 confirms sensitive data was deleted from storage maintained by a skill 290 or skill system 125, skills 290 and skill systems 125 may indicate where sensitive data is stored. For example, when a skill 290 or skill system 125 stores sensitive data, the skill 290 or skill system 125 may send, to the natural language processing system 120, data representing the storage to which the sensitive data was stored (e.g., a storage identifier), and optionally a representation of the stored sensitive data. The natural language processing system 120 may associated the received data with a skill identifier (representing the skill from which the data was received) in a storage maintained by the natural language processing system 120. Thereafter, after the natural language processing system 120 sends a deletion instruction to a skill, the natural language processing system 120 may determine a storage identifier associated with the skill's identifier in the storage maintained by the natural language processing system 120. After the natural language processing system 120 determines the skill identifier, the natural language processing system 120 may perform various actions, depending upon which the aforementioned implementations are used. For example, after the natural language processing system 120 determines the skill identifier, the natural language processing system 120 (and more particularly the data type deletion component 265, for example) may query the storage (corresponding to the determined storage identifier) for data associated with the user identifier included in the deletion instruction. For further example, after the natural language processing system 120 determines the skill identifier, the natural language processing system 120 (and more particularly the data type deletion component 265, for example) may send, the third party system, the user identifier and the skill 290 or skill system 125 identifier corresponding to the deletion instruction. In another example, after the natural language processing system 120 determines the skill identifier, the natural language processing system 120 (and more particularly the data type deletion component 265, for example) may send, to storage associated with storage identifier, an instruction to delete the type of sensitive data associated with the user identifier.

In addition to or instead of the natural language processing system 120 deleting sensitive data in response to user commands, the natural language processing system 120 may delete sensitive data based on user age. A user may be provided access to sensitive data until another user turns a certain age. Using FERPA-governed data as an example, an adult user may be provided access to a child user's academic data until the child user turns a certain age (e.g., 18). In other words, the adult user may be provided access to the child user's academic data until the child user's age satisfies a threshold age. The natural language processing system 120 may determine when a child user turns a certain age and, based thereon, thereafter prevent a corresponding adult user from having access to the child's FERPA-governed data. This may include, for example, deleting an association between the adult user's identifier and the FERPA-governed data in storage. Other non-FERPA-governed data examples are possible and envisioned by the present disclosure.

In addition to or instead of the natural language processing system 120 deleting sensitive data in response to spoken user commands (as illustrated in FIGS. 5A through 5C), the natural language processing system 120 may delete sensitive data in response to user commands received via a graphical user interface (GUI), for example one provided by a companion application. A GUI may provide a user with a history of their spoken and/or text-based user inputs. The user may provide an input representing data, associated with one or more of the displayed previous user inputs is to be deleted. Such an input may correspond to the selection of toggle boxes or virtual buttons associated with the one or more displayed previous user inputs. Data representing such an input may be sent to the natural language processing system 120. In an example, the data may be sent by a companion application installed on a device 110. Processes described with respect to FIGS. 5A through 5C may be performed in response to the natural language processing system 120 receiving the data. In such instances, the "type of sensitive data" corresponds sensitive data associated with the user-identified previous user input(s).

Sensitive data may be encrypted prior to being stored. Moreover, sensitive data may be encrypted prior to being transmitted.

In at least some examples, the natural language processing system 120 may perform deidentification processing to prevent a user's identity from being connected to the sensitive data. Deidentification processing may include pseudonymization processing and/or anonymization processing.

Pseudonymization processing replaces sensitive data, a dataset, with pseudonymous identifiers. Pseudonymous identifiers may be stored in the data type storage 285. Pseudonymization processing is reversible by an authorized party having access to additional data that is held separately from the data set that is pseudonymized.

Anonymization processing removes sensitive data from a dataset. Anonymization processing is not reversible.

The natural language processing system 120 may perform deidentification processing prior to data being sent to a skill 290 or skill system 125. In examples where the natural language processing system 120 performs deidentification processing, the natural language processing system 120 may delete sensitive data of a user (from storage maintained by the natural language processing system 120) in responsive to receiving an deletion command from the user. However, it may be unnecessary for the natural language processing system 120 to issue a deletion instruction to skills 290 and skill systems 125, as the skills 290 and skill systems 125 would be unable to identify the user requesting their sensitive data be deleted. Configuring a natural language processing system 120 to perform deidentification processing assists the natural language processing system 120 in being compliant with various privacy laws and regulations, including but not limited to the Health Insurance Portability and Accountability Act of 1996 (HIPAA) and the European Union General Data Protection Regulation (GDPR). For example, to ensure compliant with HIPAA, the natural language processing system 120 may be configured to de-identify data including, but not limited to, names, geographic subdivisions, dates, telephone numbers. vehicle identifiers, fax numbers, email addresses, web universal resource locators (URLs), social security numbers, internet protocol (IP) addresses, medical record numbers, biometric identifiers, etc.

The above describes techniques for ensuring a skill 290 deletes sensitive data. In at least some examples, when the skill 290 receives sensitive data, the skill 290 may send the sensitive data to a different computing system, such that the sensitive data is stored by the skill 290 and the other computing system. In this instances, the natural language processing system 120 may cause the sensitive data to be deleted from the skill 290 and the other computing system. To enable such deletion, the skill 290 may provide the natural language processing system 120 with data representing other computing systems to which the skill 290 sent the sensitive data. Identifiers of the other computing systems may be stored in the data type storage 285 such that the natural language processing system 120 may perform the steps of FIGS. 5A through 5C with respect to the skill 290 and the other computing systems.

Another technique for ensuring a skill 290 no longer has access to a type of information is to send the skill 290 a representation of, but not the exact, data. For example, a user may provide the natural language processing system 120 with data. For purposes of the example, we will assume the data is blood pressure information corresponding to the "PHI" data type (although one skilled in the art will appreciate that the example may apply to other data and corresponding data types). The natural language processing system 120 may store the blood pressure information (e.g., in an encrypted manner).

The user's profile may indicate that the user's blood pressure information should be sent to and stored by a particular skill (for this example, a blood pressure skill). Rather than sending the blood pressure information to the blood pressure skill, the natural language processing system 120 may use an algorithm to convert the blood pressure information into "placeholder" information that corresponds to the blood pressure information but is not the blood pressure information. For example, the blood pressure information may be 125/70 but the placeholder information may be XY/AB. The natural language processing system 120 may send the placeholder information to the skill for storage.

The foregoing limits the ability of an entity to obtaining the exact underlying data by having to interact with the natural language processing system 120, which may perform user recognition processing to ensure the requesting entity has permission to obtain the data. For example, if the natural language processing system 120 receives a command to output the blood pressure information, the natural language processing system 120 may first determine, using user recognition processing, that the user is permitted to receive the blood pressure information. Thereafter, the natural language processing system 120 may send, to the skill, data requesting blood pressure information. In turn, the skill may provide the natural language processing system 120 with the placeholder data. The natural language processing system 120 may then use the algorithm (in a reverse manner) to determine the blood pressure information from which the placeholder information was generated. The natural language processing system 120 may thereafter output the blood pressure information to the user.

When the natural language processing system 120 receives, from the user, a command to delete the type of data (e.g., blood pressure information), the natural language processing system 120 may delete the stored (e.g., encrypted) data from the natural language processing system 120's storage. The natural language processing system 120 may also send, to the skill, an instruction to delete the type of data.

One skilled in the art will appreciate, however, that the natural language processing system 120 need not, in the foregoing example, send the instruction to the skill. In other words, the natural language processing system 120's deletion of the data from its storage may be sufficient enough to break a chain between the skill and the user's blood pressure information. In at least some examples, the placeholder information may be generated based on a location at which the originated blood pressure information is stored. After the natural language processing system 120 deletes the stored data, a skill may send the placeholder information to the natural language processing system 120. The natural language processing system 120 may apply the algorithm (in a reverse manner) to the placeholder data to identify the blood pressure information in the storage. However, based on the blood pressure information already being deleted and the algorithm being dependent on a storage location of the underlying data, the result of the query may be an indicator representing "no matching search results" (e.g., representing the blood pressure information could not be identified).

Figure 7:
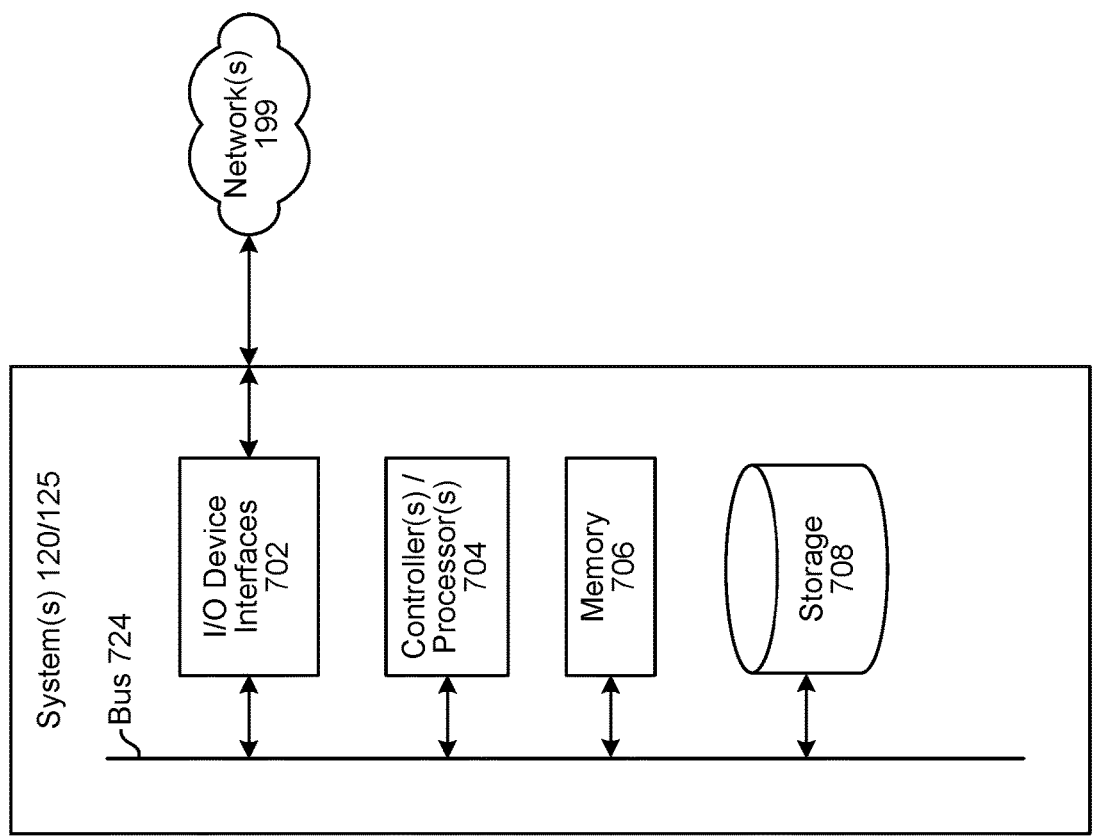
FIG. 7 is a block diagram conceptually illustrating example components of a system, in accordance with embodiments of the present disclosure.

FIG. 6 is a block diagram conceptually illustrating a device 110/112 that may be used with the system. FIG. 7 is a block diagram conceptually illustrating example components of a remote device, such as the natural language processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the natural language processing system 120, or a skill system 125 may include their own dedicated processors, memory, and/or storage. Alternatively, one or more of the components of the device(s) 110, the natural language processing system 120, or a skill system 125 may utilize the I/O interfaces (602/702), processor(s) (604/704), memory (606/706), and/or storage (608/708) of the device(s) 110, natural language processing system 120, or the skill system 125, respectively.

Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 225, as described herein, are illustrative, and may be located as a stand-alone device or may be included, in whole or in part, as a component of a larger device or system.

Figure 8:
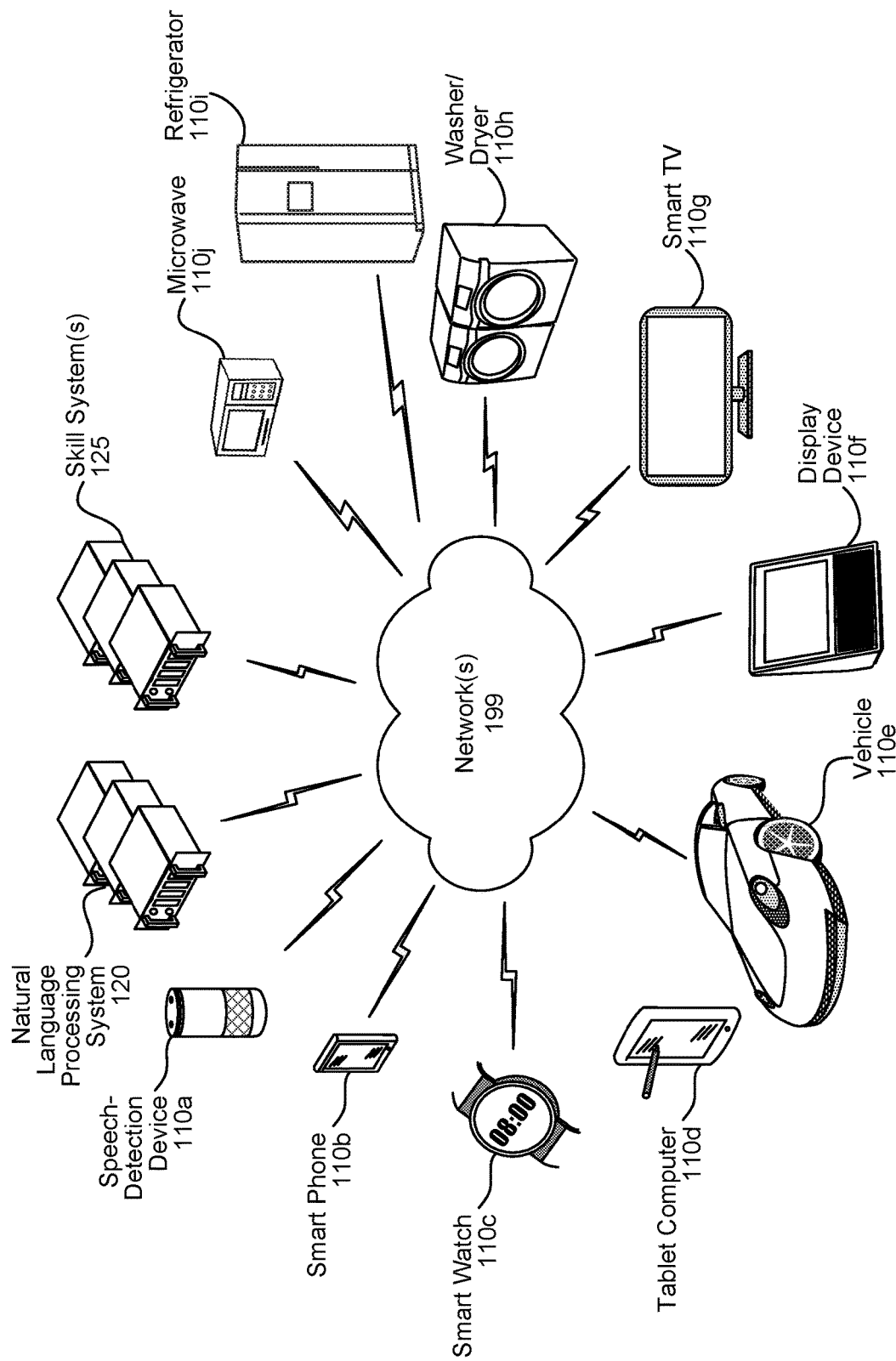
FIG. 8 illustrates an example of a computer network for use with the overall system, in accordance with embodiments of the present disclosure.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    receiving first data representing a first spoken user input;
    determining an intent indicator representing the first spoken user input;
    determining an application configured to execute with regard to the intent indicator;
    determining the application is to process a first type of information to execute the intent indicator;
    determining a profile identifier corresponding to the first data;
    determining first information associated with the profile identifier and corresponding to the first type of information;
    sending the intent indicator to the application;
    sending the first information to the application;
    receiving, after sending the intent indicator and the first information, second data representing a second spoken user input;
    determining the second spoken user input requests deletion of the first type of information;
    determining the profile identifier corresponds to the second data;
    determining, based at least in part on determining the profile identifier corresponds to the second data, that the first information was previously sent to the application; and sending, to the application, a command to delete the first information.

2. The method of claim 1, further comprising:
determining a storage corresponding to the application;
querying, after receiving the second data, the storage for the first information associated with the profile identifier; and
receiving, from the storage, third data representing an absence of matching search results.

3. The method of claim 1, further comprising:
receiving third data representing a third spoken user input corresponding to the profile identifier;
determining the third spoken user input comprises a second type of information;
representing, in a storage, the second type of information;
generating, using a storage location of the second type of information, fourth data corresponding to the second type of information;
sending the fourth data to the application;
receiving, after sending the fourth data, fifth data representing a fourth spoken user input;
determining the fourth spoken user input requests deletion of the second type of information;
deleting the second type of information from the storage;
receiving, after deleting the second type of information from the storage, the fourth data from the application;
querying, using the fourth data, the storage for the second type of information; and
receiving, based at least in part on the second type of information being deleted from the storage prior to receiving the fourth data and the fourth data being generated using the storage location, an indicator representing an absence of matching search results.

4. The method of claim 1, further comprising:
sending, after sending the command and to a system in communication with and separate from the application, the profile identifier and an application identifier corresponding to the application; and
receiving, from the system, third data representing an absence of search results corresponding to the profile identifier in a storage corresponding to the application identifier.

5. A system, comprising:
at least one processor; and
at least one memory comprising instructions that, when executed by the at least one processor, cause the system to:
receive first data representing a first user input;
determine an intent indicator representing the first user input;
determine a first application configured to execute with regard to the intent indicator;
determine the first application is to process a first type of information to execute the intent indicator;
determine a first profile identifier corresponding to the first data;
determine first information associated with the first profile identifier and corresponding to the first type of information;
send the intent indicator to the first application;
send the first information to the first application;
receive, after sending the intent indicator and the first information, second data representing a second user input;
determine the second user input requests deletion of the first type of information;

determine the first information was previously sent to the first application; and
send, to the first application, a first command to delete the first information.

6. The system of claim 5, wherein the at least one memory further comprises instructions that, when executed by the at least one processor, further cause the system to:
determine a storage corresponding to the first application;
query, after sending the first command, the storage for the first information associated with the first profile identifier; and
receive, from the storage, third data representing an absence of matching search results.

7. The system of claim 5, wherein the at least one memory further comprises instructions that, when executed by the at least one processor, further cause the system to:
determine the first profile identifier is associated with a second type of information corresponding to a second profile identifier;
determine a user age corresponding to the second profile identifier;
determine the user age satisfies a threshold user age; and
delete, based at least in part on determining the user age satisfies the threshold user age, an association between the first profile identifier and the second type of information.

8. The system of claim 5, wherein the at least one memory further comprises instructions that, when executed by the at least one processor, further cause the system to:
send, after sending the first command and to a first system in communication with and separate from the first application, the first profile identifier and an application identifier corresponding to the first application; and
receive, from the first system, third data representing an absence of search results corresponding to the first profile identifier in a storage corresponding to the application identifier.

9. The system of claim 5, wherein the at least one memory further comprises instructions that, when executed by the at least one processor, further cause the system to:
receive the second data from a second application installed on a first device, the second application generating the second data in response to the second user input corresponding to a selection of the first user input from among a plurality of user inputs.

10. The system of claim 5, wherein the at least one memory further comprises instructions that, when executed by the at least one processor, further cause the system to:
receive third data representing a third user input;
determine the third user input comprises a second type of information;
represent, in storage, the second type of information;
generate, using a storage location of the second type of information, fourth data corresponding to the second type of information;
send the fourth data to the first application;
receive, after sending the fourth data, fifth data representing a fourth user input;
determine the fourth user input requests deletion of the second type of information;
delete the second type of information from the storage;
receive, after deleting the second type of information from the storage, the fourth data from the first application;
query, using the fourth data, the storage for the second type of information; and
receive, based at least in part on the second type of information being deleted from the storage prior to receiving the fourth data and the fourth data being generated using the storage location, an indicator representing an absence of matching search results.

11. The system of claim 5, wherein the at least one memory further comprises instructions that, when executed by the at least one processor, further cause the system to:
receive the first profile identifier from the first application;
store, based at least in part on determining the first application is configured to execute the intent indicator, an association between the first profile identifier and the first type of information; and
generate the first command to comprise the first profile identifier.

12. The system of claim 5, wherein the at least one memory further comprises instructions that, when executed by the at least one processor, further cause the system to:
determine an application identifier corresponding to the first application; and
store an association between the first profile identifier, the application identifier, and the first type of information.

13. A method, comprising:
receiving first data representing a first user input;
determining an intent indicator representing the first user input;
determining a first application configured to execute with regard to the intent indicator;
determining the first application is to process a first type of information to execute the intent indicator;
determining a first profile identifier corresponding to the first data;
determining first information associated with the first profile identifier and corresponding to the first type of information;
sending the intent indicator to the first application;
sending the first information to the first application;
receiving, after sending the intent indicator and the first information, second data representing a second user input;
determining the second user input requests deletion of the first type of information;
determining the first information was previously sent to the first application; and
sending, to the first application, a first command to delete the first information.

14. The method of claim 13, further comprising:
determining a storage corresponding to the first application;
querying, after sending the first command, the storage for the first information associated with the first profile identifier; and
receiving, from the storage, third data representing an absence of matching search results.

15. The method of claim 13, further comprising:
determining the first profile identifier is associated with a second type of information corresponding to a second profile identifier;
determining a user age corresponding to the second profile identifier;
determining the user age satisfies a threshold user age; and
deleting, based at least in part on determining the user age satisfies the threshold user age, an association between the first profile identifier and to the second type of information.

16. The method of claim 13, further comprising:
sending, after sending the first command and to a system in communication with and separate from the first application, the first profile identifier and an application identifier corresponding to the first application; and
receiving, from the system, third data representing an absence of search results corresponding to the first profile identifier in a storage corresponding to the application identifier.

17. The method of claim 13, further comprising:
receiving the second data from a second application installed on a first device, the second application generating the second data in response to the second user input corresponding to a selection of the first user input from among a plurality of user inputs.

18. The method of claim 13, further comprising:
receiving third data representing a third user input;
determining the third user input comprises a second type of information;
representing, in storage, the second type of information;
generating, using a storage location of the second type of information, fourth data corresponding to the second type of information;
sending the fourth data to the first application;
receiving, after sending the fourth data, fifth data representing a fourth user input;
determining the fourth user input requests deletion of the second type of information;
deleting the second type of information from the storage;
receiving, after deleting the second type of information from the storage, the fourth data from the first application;
querying, using the fourth data, the storage for the second type of information; and
receiving, based at least in part on the second type of information being deleted from the storage prior to receiving the fourth data and the fourth data being generated using the storage location, an indicator representing an absence of matching search results.

19. The method of claim 13, further comprising:
receiving the first profile identifier from the first application;
storing, based at least in part on determining the first application is configured to execute the intent indicator, an association between the first profile identifier and the first type of information; and
generating the first command to comprise the first profile identifier.

20. The method of claim 13, further comprising:
determining an application identifier corresponding to the first application; and
storing an association between the first profile identifier, the application identifier, and the first type of information.

* * * * *